Oct. 16, 1923.
R. A. BOEHM
1,470,683
SCREW CUTTING MACHINE
Filed April 7, 1922
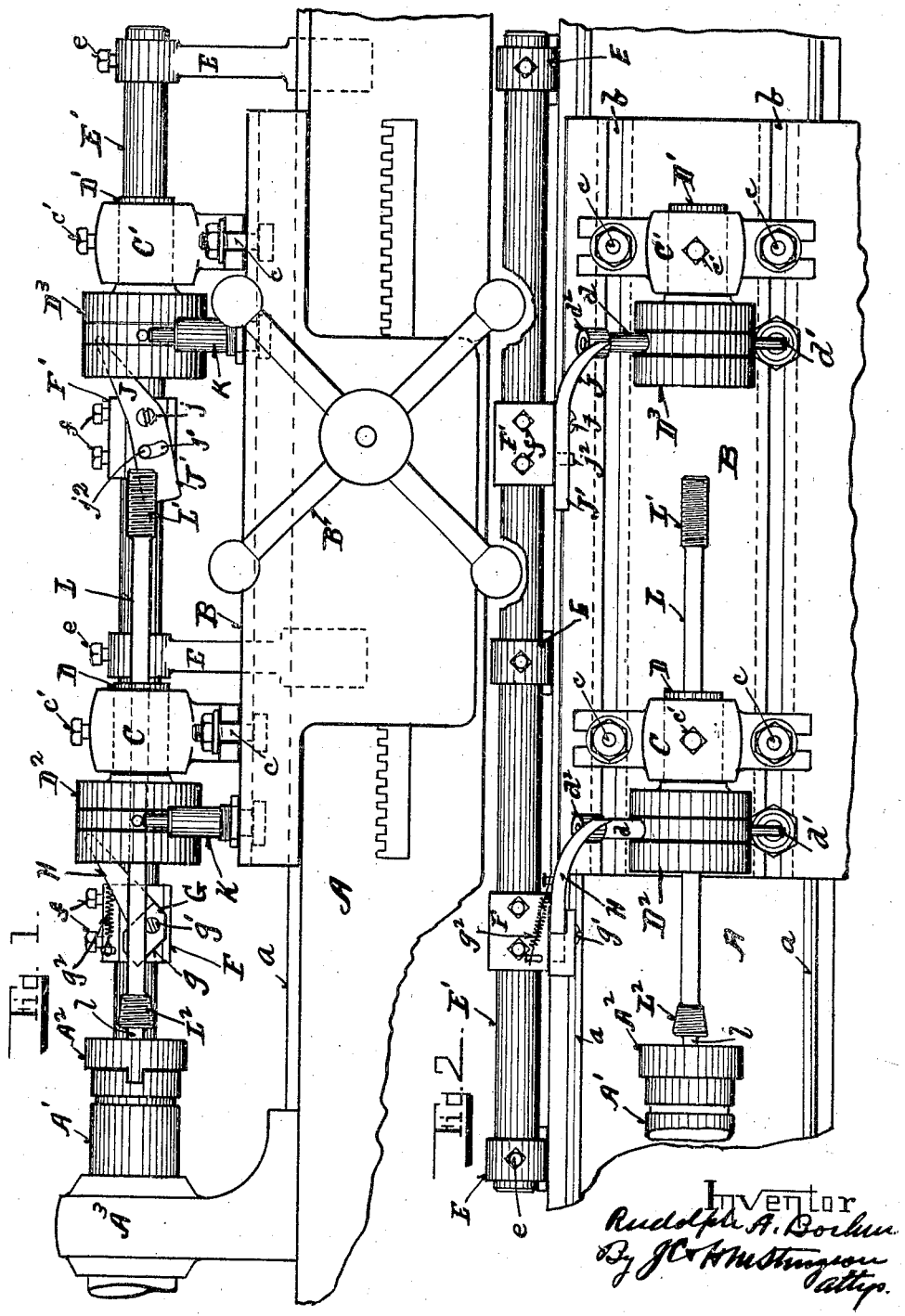

Patented Oct. 16, 1923.

1,470,683

UNITED STATES PATENT OFFICE.

RUDOLPH A. BOEHM, OF ERIE, PENNSYLVANIA, ASSIGNOR TO RICKERT-SHAFER COMPANY, OF ERIE, PENNSYLVANIA, A CORPORATION OF PENNSYLVANIA.

SCREW-CUTTING MACHINE.

Application filed April 7, 1922. Serial No. 550,366.

*To all whom it may concern:*

Be it known that I, RUDOLPH A. BOEHM, a citizen of the United States, residing at Erie, in the county of Erie and State of Pennsylvania, have invented certain new and useful Improvements in Screw-Cutting Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to screw cutting attachments for lathes and other machines, and it relates more particularly to mounting screw cutting dies in tandem, so as to cut simultaneously, two or more threads at different points in the length of a rod.

The object of my invention is to provide suitable mechanism adapted to be placed upon a lathe which will cut threads upon a rod at a plurality of points in the length thereof simultaneously.

Another object of my invention is to provide mechanism which will cut tapered threads at one point and straight threads at another point.

In carrying out the objects of my invention I mount upon the slide-ways of a lathe, a platform which can be moved longitudinally on said slide-ways by the ordinary hand-feed mechanism of the lathe, and upon this platform I mount one or more threading dies so that the axes of said dies are on the line of the axis of the spindle of the lathe. The threading dies which I use for this purpose are of the type shown and described in U. S. Letters Patent No. 1,119,676 issued upon my application, December 1, 1914, in which the chasers automatically open after the desired number of threads have been cut. This opening and closing movement of the chasers is accompanied by a rotary movement of one portion of the die holder as described in said patent for which a handle was provided in said patent.

In the present invention I provide cam-levers which are adapted to engage the operating handles of the die holders, and as the platform carrying the die holders is moved toward the lathe spindle, said handles engage said cam-levers and rotate the rotatable portion of the die holders to close the chasers, and the chasers are thereby maintained closed until the die holder handles pass beyond the ends of said cam-levers, when the dies automatically open as described in said patent.

On the backward movement of the platform and die holders said cam-levers are adapted to allow the die holder handles to pass over their upper edges.

These and other features of my invention are hereinafter more fully set forth and pointed out and are illustrated in the accompanying drawings in which:

Figure 1, is a front elevation of a portion of a lathe provided with my improved screw-cutting attachments.

Figure 2, is a plan view of the same.

In these drawings A indicates the frame of a lathe, portions thereof being broken away; $a$ $a$ indicates the usual slide-ways on said frame, $A'$ indicates the usual lathe spindle, and $A^2$ indicates a chuck secured on the spindle $A'$; said chuck being adapted to receive the square end of a work-piece, as hereinafter described. $A^3$ is a head-stock bracket in which the spindle $A'$ is journalled.

Upon the slide-ways $a$ $a$ I place a platform B which is provided with the usual hand-feed levers $B'$, and gear and rack mechanism (not shown) for moving the platform B longitudinally on the slide-ways $a$ $a$. This platform B is preferably provided with longitudinal key-slots $b$ $b$, which are adapted to receive the heads of bolts, as hereinafter described. Upon the platform B I place brackets C, C' which are secured in proper position on the platform for the work required, by means of bolts $c$, the heads of which are in the key-slots $b$ $b$. Secured in the brackets C and C' are the shanks D and D' of the die holders $D^2$ and $D^3$, by means of set screws $c'$, the brackets C and C' supporting the die-holders $D^2$ and $D^3$ on the line of the axis of the spindle $A'$.

The die holders $D^2$ and $D^3$ are of the type shown and described in the U. S. patent hereinbefore mentioned, being spring operated in the opening direction, and manually operated by means of the lever $d$ in the closing direction. They are also preferably provided with a stop $d'$ for the purpose hereinafter described. The closing levers $d$ of the die holders are preferably provided with a roller $d^2$.

Secured on the lathe frame A are brackets E E E in the upper end of which is secured a shaft E' by means of set screws $e$. Upon the shaft E' are placed blocks F and F', said blocks being retained in their longitudinal position on said shaft by means of set screws $f$.

Upon the block F I secure a stationary guide-plate G which is provided with an upwardly inclined surface $g$, and pivoted between the guide-plate G and the block F, by means of the pivot screw $g'$ is a cam-lever H, which swings upon the pivot-screw $g'$, the upward movement thereof being limited by the guide-plate G.

The cam-lever H is yieldingly maintained in the position shown in Fig. 1, by means of a spring $g^2$, so that when said lever is pressed downward as hereinafter described, it will return to its normally raised position when released.

The guide-plate G and lever H are designed to operate the die holder $D^2$ to cut a tapered thread as hereinafter described.

Upon the block F' is pivoted a cam-lever J by means of a pivot screw $j$, said lever being provided with a rearwardly extending portion J', the portion J being provided with a transverse slot $j'$ in which a post $j^2$ secured in the block F' operates to limit the swinging movement of the lever J, so that when the post $j^2$ stops the swing of said lever the lower edge of the portion J' of the lever J is parallel with the axes of the die holders $D^2$ and $D^3$.

The lever J—J' is designed to operate the die holder $D^3$ to cut a thread of uniform diameter as hereinafter described.

Secured upon the platform B are posts K with which the stop arms $d'$ contact when the arms $d$ on the die holders $D^2$ and $D^3$ pass around the rear ends of the guide-plate G and lever J—J', so as to limit the spring actuated opening movement of the rotatable portion of the die-holders.

In operation a stay-bolt L or other rod which is required to be threaded is passed through the open die-holders, and the square end $l$ thereof is inserted into the chuck $A^2$ on the spindle A'. The feed wheel B' is then operated to force the platform B forward, which carries the die-holders $D^2$ and $D^3$ toward the work-piece to be threaded; the rollers $d^2$ on the handle $d$ of the die holders $D^2$ and $D^3$ are engaged by the cam-levers G and J, and are thereby, during the continued movement of the die-holders, forced to swing downward thus causing the rotation of the rotatable portions of the die holders, which causes the chasers to close inwardly to their cutting position.

The roller $d^2$ on the handle $d$ of the die holder $D^3$ travels downwardly along the inclined under edge of the cam-lever J until it passes opposite the pivot screw $j$, when the portion J' of said lever swings upward until it is stopped by the post $j^2$ with its lower edge parallel with the axes of the die holders, when the chasers in said die holder commence cutting a thread L' on the stay-bolt. Meanwhile the roller $d^2$ on the handle $d$ of the die holder $D^2$ having passed downwardly along the under inclined edge of the cam-lever H, has also closed the chasers in the die holder $D^2$ to their cutting position, and said roller continues to travel along the under edge of the guide-plate G until it begins to travel along the upwardly inclined under edge $g$ of said plate, which permits the gradual opening of the chasers in the die-holder $D^2$ during their cutting of the tapered threads $L^2$ on the stay-bolt.

When the rollers $d$ pass the rear ends of the guide-plate G and cam-lever J—J' the spring action of the die holders causes the handles $d$ thereof to swing upward to their initial or open position of the dies. The feed wheel B' is then operated to move the platform B and die holders thereon backward, which carries the rollers $d^2$ over the upper edges of the cam levers H and J, swinging said levers downward as they pass thereover.

The work-piece L is then removed. The free ends of the cam levers H and J are curved toward the die holders to adapt them to the circular movement of the rollers $d$ during the closing of the die holders.

From the foregoing description of the construction and operation it will be apparent to those skilled in the art, that any desired number of die-holders can be employed which may be required to simultaneously cut threads at desired points on the work-piece; also that all of the threads may be tapered, or all may be of uniform diameter, as desired.

The placing of the blocks F and F' upon the shaft E' at the proper position for the work required will be easily determined by the operator.

Having thus fully described my invention so as to enable others to utilize the same, I do not desire to be limited to the exact mechanism shown and described, as many modifications can be made therein without departing from the scope of my invention; therefore what I claim as new and desire to secure by Letters Patent is:—

1. In a machine of the class described, a self opening die holder, an operating arm thereon, and means supported in the horizontal path of feed travel of said arm adapted to engage said operating arm to close said die holder and control the opening of the same.

2. In a machine of the class described, a self opening die holder, an operating arm thereon, an inclined guide mechanism supported adjacent to said die holder and adapted to engage and move said arm to close said die holder and guide said arm during the thread cutting operation.

3. In a machine of the class described, a self opening die holder, an operating arm thereon, an inclined guide mechanism supported adjacent to said die holder and adapted to engage and move said arm to close said die holder to its thread cutting position, and guide said die closing arm during the cutting operation, and to permit the passage of said arm thereover during the receding movement of said die holder to its initial position.

4. In a machine of the class described, a self opening die holder, an operating arm thereon, a vertically swinging guide supported adjacent to said die holder, means to yieldingly maintain said guide in its operative position so that it will engage said die operating arm and cause it to close said die holder as the same moves forward to its work and control the degree of closure of said die during the thread cutting operation until said operating arm passes beyond said guide, and to permit said operating arm to pass over said guide during the recession of said die holder to its initial position.

5. In a machine of the class described, a frame, slide-ways thereon, a platform on said slide-ways, mechanism to move said platform longitudinally on said slide-ways, a head-stock on said frame, a spindle mounted in said head-stock, a self opening die holder secured on said platform, an operating arm on said die holder, brackets secured on said frame, a bar secured in said brackets and parallel with the axes of said spindle and die, a block secured on said bar, an inclined guide pivoted on said block and positioned in the path of travel of said operating arm, and adapted to engage and move said arm to cause said die holder to close and guide the same during the thread cutting operation.

6. In a machine of the class described, a frame, slide-ways thereon, a platform on said slide-ways, mechanism to move said platform longitudinally on said slide-ways, a plurality of die holders mounted on said platform in spaced relation to each other, operating arms on said die holders, means to adjust the spaced relation of said die holders, a head stock on said frame, a spindle in said head stock on the axial line of said die holders, brackets on said frame, a bar supported in said brackets parallel to the axis of said die holders, a plurality of blocks secured on said bar, swinging guides pivoted on said blocks in the path of travel of said operating arms adapted to engage said operating arms and operate them to close said die holders and guide said operating arms during the thread cutting operation.

In testimony whereof I affix my signature.

RUDOLPH A. BOEHM.